United States Patent
Shitano (10) Patent No.: US 8,296,432 B2
(45) Date of Patent: Oct. 23, 2012

(54) COMMUNICATION APPARATUS, DISTRIBUTION APPARATUS, CONTROL METHOD, RECORDING MEDIUM AND SYSTEM

(75) Inventor: Masaki Shitano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 12/638,877

(22) Filed: Dec. 15, 2009

(65) Prior Publication Data

US 2010/0153517 A1   Jun. 17, 2010

(30) Foreign Application Priority Data

Dec. 17, 2008   (JP) .................................. 2008-321644

(51) Int. Cl.
*G06F 13/00* (2006.01)

(52) U.S. Cl. ......... 709/225; 709/219; 709/227; 709/250

(58) Field of Classification Search .................. 709/217, 709/219, 223, 225, 227, 228, 250
See application file for complete search history.

(56) References Cited

U.S. PATENT DOCUMENTS

| 6,405,240 | B1 * | 6/2002 | Tsubone et al. | 709/203 |
| 7,814,483 | B2 * | 10/2010 | Li et al. | 717/177 |
| 2007/0088779 | A1 * | 4/2007 | Kagaya | 709/203 |
| 2009/0222422 | A1 * | 9/2009 | Yoon et al. | 707/3 |

FOREIGN PATENT DOCUMENTS

JP   2008-134967 A   6/2008

* cited by examiner

*Primary Examiner* — Viet Vu
(74) *Attorney, Agent, or Firm* — Carter, DeLuca, Farrell & Schmidt LLP (57) ABSTRACT

A communication apparatus connected to an external apparatus via a network includes a connection unit configured to connect to a distribution apparatus via a network in one of a first communication mode for transferring a notification message which indicates that the distribution apparatus having the function of distributing contents exists on a network, to the external apparatus, and a second communication mode for restricting the transfer of the notification message to the external apparatus; an acquisition unit configured to acquire contents from the distribution apparatus based on the notification message transmitted from the distribution apparatus when the communication apparatus is connected to the distribution apparatus via a network by the connection unit in the second communication mode; and a distribution unit configured to distribute the contents acquired by the acquisition unit in response to a request from the external apparatus instead of the distribution apparatus.

15 Claims, 10 Drawing Sheets

COMMUNICATION APPARATUS, DISTRIBUTION APPARATUS, CONTROL METHOD, RECORDING MEDIUM AND SYSTEM

BACKGROUND OF THE INVENTION

1. Field of the Invention

The present invention relates to a communication apparatus for distributing contents by proxy, an apparatus for distributing contents, its control method, a program and a system.

2. Description of the Related Art

Conventionally, in a home appliance network system, a DLNA guideline has been proposed in order to enable mutual use of contents (image, video image, etc.) between appliances. DNLA is an abbreviation of digital living network alliance (http://www.dlna.org/).

In the DLNA guideline, a digital media server (DMS) for distributing a network service and a digital media player (DMP) for receiving the network service are defined.

The network service is a service in which, for example the DMS distributes contents (image data or video image data) to the DMP and the DMP acquires contents from the DMS.

In the DLNA, a network service is mainly executed using a protocol defined by UPnP™. UPnP™ is an abbreviation of universal plug and play.

Japanese Patent Application Laid-Open No. 2008-134967 discusses a configuration in which the DMP acquires contents using information notified by the DMS. More specifically, when the DMS is connected to a network, the DMS notifies the DMP of metadata containing a uniform resource locator (URL) which indicates the location of contents using a protocol defined by the UPnP™. The DMP accesses the URL which indicates the location of contents, thereby acquiring contents.

Further, a portable device such as a digital camera with such a function of the DMS has also appeared.

However, when the portable device having a poor computer resource functions as a distribution apparatus (DMS), high-value-added processing such as sorting or retrieval type request processing needs to be executed. Further, when the distribution apparatus is frequently accessed from an external apparatus, a power consumption is increased.

Furthermore, even if the portable device has a function as the distribution apparatus, the contents may not be distributed because a user of the portable device frequently switches on and off a power source and an operation mode.

SUMMARY OF THE INVENTION

The present invention is directed to distributing contents via a communication apparatus to an external apparatus instead of a distribution apparatus.

According to an aspect of the present invention, a communication apparatus connected to an external apparatus via a network includes a connection unit configured to connect to a distribution apparatus via a network in one of a first communication mode for transferring a notification message which indicates that the distribution apparatus having the function of distributing contents exists on a network, to the external apparatus and a second communication mode for restricting the transfer of the notification message to the external apparatus; an acquisition unit configured to acquire contents from the distribution apparatus based on the notification message transmitted from the distribution apparatus when the communication apparatus is connected to the distribution apparatus via a network by the connection unit in the second communication mode; and a distribution unit configured to distribute the contents acquired by the acquisition unit in response to a request from the external apparatus instead of the distribution apparatus.

According to another aspect of the present invention, a distribution apparatus having the function of distributing contents includes a selection unit configured to select a communication mode when making a connection in one of a first communication mode in which a communication apparatus transfers a notification message indicating that the distribution apparatus exists on a network, to an external apparatus and a second communication mode for preventing the communication apparatus from transferring the notification message to the external apparatus; a connection unit configured to select the second communication mode using the selection unit to connect to the communication apparatus so that the communication apparatus can distribute contents to the external apparatus instead of the distribution apparatus; a transmission unit configure to transmit the notification message to the communication apparatus in response to connection by the connection unit; and a distribution unit configured to distribute contents to the communication apparatus in response to the request of contents based on the notification message from the communication apparatus.

According to yet another aspect of the present invention, a communication apparatus connects to a distribution apparatus which distributes contents via a network different from the network connected to an external apparatus. Thus, a communication apparatus can distribute the contents to an external apparatus instead of the distribution apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
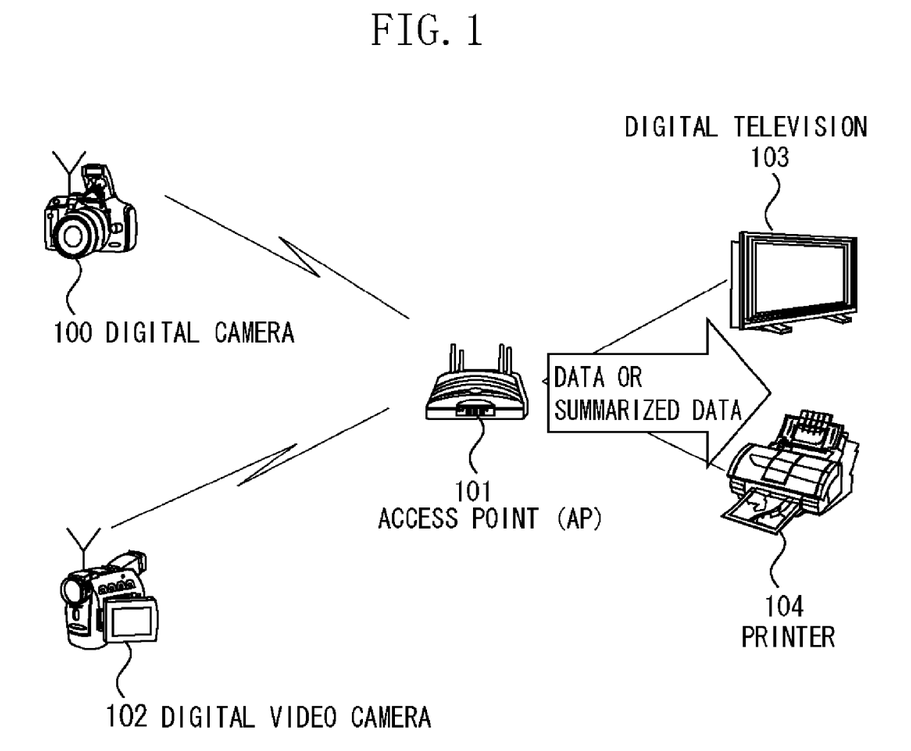
FIG. 1 is a diagram illustrating a network system.

FIG. 1 is a diagram illustrating the entire network system according to an exemplary embodiment of the present invention. Each apparatus (device) has a control function for controlling the apparatus itself and a communication function for communicating with other apparatuses.

A digital camera 100 serves as a service distribution apparatus. The digital camera 100 has the function of distributing contents such as an image and a video image to an apparatus (external apparatus) connected to a network utilizing the UPnP™. Further, the digital camera 100 has the function of notifying an external apparatus of an update of the contents.

A wireless LAN access point 101 (hereinafter, referred to as AP) conforms to IEEE 802.11 series as one example of a proxy apparatus having a substitute function for a service distribution apparatus. IEEE is an abbreviation of Institute of Electrical and Electronics Engineers. Further, LAN is an abbreviation of local area network.

The substitute function is a function of distributing contents such as an image and a video image to an external apparatus instead of the service distribution apparatus. In the present exemplary embodiment, the proxy apparatus 101 distributes contents to an external apparatus utilizing the UPnP™.

In more detail, when the service distribution apparatus is connected to a network, the service distribution apparatus advertises a URL which indicates a location where contents of the service distribution apparatus exist on a network as metadata utilizing the UPnP™. URL is an abbreviation of uniform resource locator. Further, the metadata also includes the name of a file, the size of a file, the type of a file (Joint Photographic Experts Group (JPEG), bit map, etc.), and a URL which indicates a location where a comment associated with contents data and contents data exist.

The proxy apparatus receiving metadata transmitted from the service distribution apparatus accesses the URL and receives the contents from the service distribution apparatus. The proxy apparatus having received the contents from the service distribution apparatus changes a location (URL) where contents data exists, to a location within the proxy apparatus to record them on metadata. Further, the proxy apparatus advertises the changed metadata to an external apparatus.

When the external apparatus having received the metadata acquires contents from the service distribution apparatus utilizing the UPnP™, the proxy apparatus carries out processing for distributing contents as a proxy. The external apparatus which acquires the contents accesses the proxy apparatus from a description of a URL contained in metadata to acquire the contents from the proxy apparatus.

Thus, the proxy apparatus can execute substitute processing.

Further, the proxy apparatus can also periodically collect metadata and contents from the distribution apparatus to notify an external apparatus of an update of the contents based on the collected metadata.

In this way, the proxy apparatus carries out as a substitute the distribution apparatus. Thus, even if the distribution apparatus is an apparatus having a poor computer resource as portable equipment, the distribution apparatus does not need to execute high-value-added processing such as sorting and retrieval type request processing. Further, since the distribution apparatus is not frequently accessed from an external apparatus, a power consumption can be reduced.

Furthermore, even if the distribution apparatus is an apparatus in which a user frequently switches on and off a power source and an operation mode, such as a portable equipment, the proxy apparatus carries out as a substitute the distribution apparatus. Thus, the distribution apparatus can distribute contents.

The proxy apparatus 101 is connected with a video camera 102 via wireless communication conforming to IEEE802.11 series. Further, the proxy apparatus 101 is connected with a digital television 103 and a printer 104 in a wire communication. Namely, the video camera 102, the digital television 103 and the printer 104 are an external apparatus. A network is constructed between the proxy apparatus 101 and the external apparatuses 102 to 104. As an apparatus which constructs a system, the present exemplary embodiment includes the above-described apparatus. However, the apparatus is not limited to the above examples.

When the digital camera 100 enters an already constructed network, it is assumed that the digital camera 100 is connected to the proxy apparatus 101 in an infrastructure mode (hereinafter, referred to as infra mode) conforming to IEEE 802.11 series. When connected in the infrastructure mode, each apparatus can communicate via the proxy apparatus 101. Further, in the infra mode, association is executed to connect to an external apparatus.

When the digital camera 100 is connected to the proxy apparatus 101, the digital camera 100 advertises to the network metadata containing a location (URL) where contents are present on a network, according to the rule of the UPnP™. The location where the contents are present is within the digital camera 100.

When the proxy apparatus 101 connected to the digital camera 100 in the infra mode receives advertisement of the metadata, the proxy apparatus 101 transfers the metadata. Accordingly, the external apparatuses 102, 103 and 104 also receive the metadata. Thus, when the external apparatuses 102, 103 and 104 acquire contents from the service distribution apparatus utilizing the UPnP™, despite the presence of the proxy apparatus 101, the external apparatuses 102, 103 and 104 can refer to the meta data and directly access the digital camera 100. If the external apparatuses directly access the service distribution apparatus, the proxy apparatus 101 cannot execute substitute processing.

Further, when the external apparatuses frequently access the service distribution apparatus, there is a problem that a processing load of the service distribution apparatus is increased. This poses a significant problem when the processing resource of the service distribution apparatus is small.

A method will be described below which solves the above-described problem by preventing external apparatuses from directly accessing the service distribution apparatus.

Figure 2:
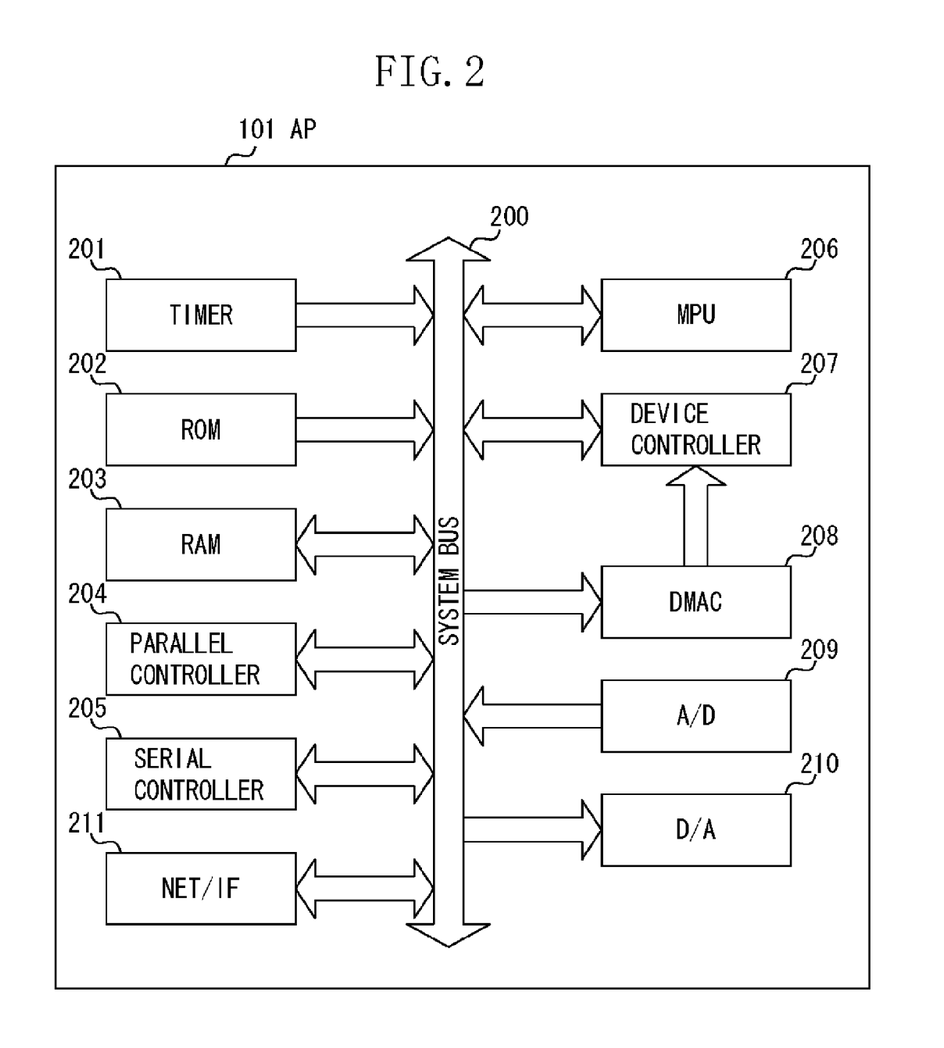
FIG. 2 is a block diagram illustrating a hardware configuration of a wireless LAN access point (AP).

FIG. 2 is a block diagram illustrating a hardware configuration of an AP 101.

A system bus 200 (address bus, data bus, and control bus) is provided to connect respective blocks (units).

A timer 201 has the function of generating an interrupt at the designated time interval. Further, the timer 201 has a watch dog timer function of measuring a hardware time of a computer, and a timekeeping function.

A read only memory (ROM) 202 has the function of storing a program code which is used in the present exemplary embodiment.

A random access memory (RAM) 203 has a function as a main memory, an execution program area, and a data area.

A parallel controller 204 has the function of inputting and outputting parallel data which is handled inside a computer, to and from an external apparatus as it is.

A serial controller 205 has the function of outputting parallel data which is handled inside a computer as series data, and inputting the series data converted into the parallel data.

A micro processor unit (MPU) 206 has the function of sequentially executing commands of a program and executing control.

A device controller 207 has the function of connecting general external input/output apparatuses such as a hard disk and a display.

A direct memory access controller (DMAC) 208 has the function of controlling direct delivery of data between a memory and an external apparatus.

An analog to digital (A/D) converter 209 has the function of converting data from analog to digital and, for example, has the function of digitizing a quantity sensed by a sensor or the like as digital data.

A digital to analog (D/A) converter 210 has the function of converting data from digital to analog and has the function of digitizing an operation amount for an external actuator or the like.

A network interface (NET/IF) 211 executes control for transferring data to an external apparatus via a network and diagnosis of connection conditions with an external apparatus.

Figure 3:
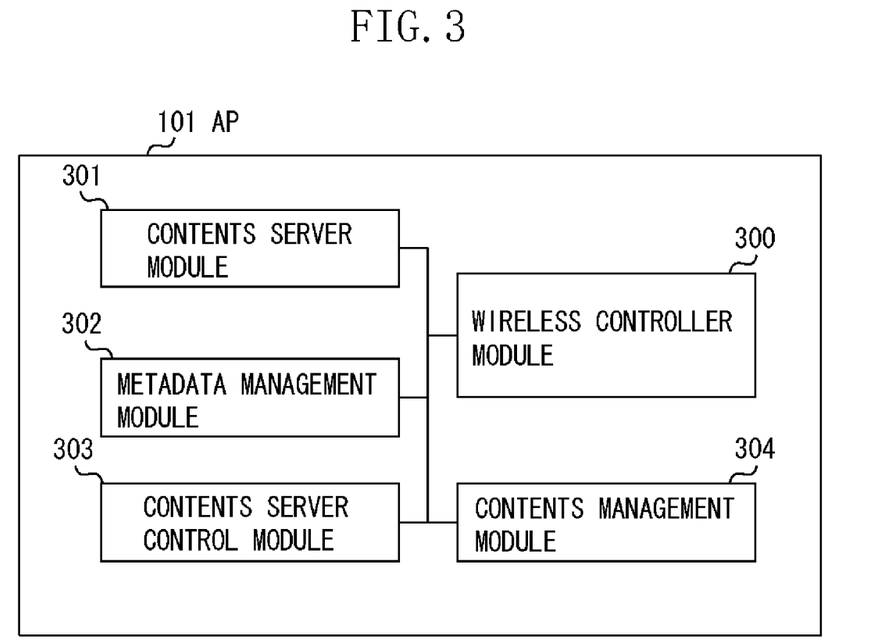
FIG. 3 is a block diagram illustrating a module configuration which is an internal configuration of an AP.

FIG. 3 is a block diagram illustrating a software module configuration concerning a network utilizing the UPnP™ of the proxy apparatus 101.

A wireless controller module 300 has a connection function supporting both an ad hoc mode and an infra mode conforming to IEEE802.11 series and can be connected to a wireless LAN network using the connection function. The wireless controller module 300 uses a beacon corresponding to both connection modes of the ad hoc mode and the infra mode, thereby enabling simultaneous connection with both the ad hoc mode and the infra mode equipment. In the present exemplary embodiment, when the proxy apparatus (AP101) is connected to the distribution apparatus (digital camera 100) in the ad hoc mode, the distribution apparatus cannot communicate with an external apparatus via the proxy apparatus. Thus, the distribution apparatus directly communicates with the proxy apparatus on one-to-one basis. In addition, in the ad hoc mode, association is not executed to connect to an external apparatus.

Further, the wireless controller module 300 has a function of transmitting a WakeupOnWLAN (hereinafter, referred to as WOL) packet to switch an external apparatus from a sleep mode to a normal mode. The sleep mode refers to an operation mode in which an external apparatus can save electric power by restricting a part of a function (e.g., a photographing function, a display function, etc.) Also, the normal mode refers to an operation mode in which all functions of an external apparatus can be used.

A contents server module 301 has a function of distributing contents such as image data which is held inside, to the digital television 103, the printer 104 or the like which is connected to a network. Further, the contents server module 301 has an SSDP, a GENA and an SOAP which are a device architecture function of the UPnP™.

SSDP is an abbreviation of simple service discovery protocol. The SSDP can find a device connected to a network and grasp a function included in the device. Further, using the SSDP, an ALIVE message which is an existence notification message indicating its existence on a network can be transmitted.

GENA is an abbreviation of general event architecture. The GENA can notify other apparatuses connected to a network, of an update of contents held inside an apparatus.

SOAP is an abbreviation of simple object access protocol. The SOAP can exchange various messages with an external apparatus to execute the predetermined operation to the external apparatus.

Thus, the contents server module 301 can execute processing such as advertisement of its own presence, notification of internal conditions, receipt of control commands and a search of external apparatuses.

A metadata management module 302 has a function of a Media Server V 1.0 of the UPnP™ and executes processing such as generation, control, deletion and update of metadata on an image held by the apparatus. The processing may automatically be executed or may be executed by instructions of a user. Further, the metadata management module 302 has a function of distributing metadata of an image to the digital television 103, the printer 104 or the like connected to a network via a network interface 211. Furthermore, the metadata management module 302 has a function of executing session management when it is accessed by the digital television 103, the printer 104 or the like.

A contents server control module 303 has a control point function for the SSDP, the GENA and the SOAP and the like, which is a device architecture function of the UPnP™. The control point function refers to a function of controlling a contents distribution apparatus (in a present case, the digital camera 100). More specifically, it is a function for acquiring, deleting, or updating the contents or the metadata of the contents in the contents distribution apparatus. Thus, the contents server control module 303 can control a contents distribution service of the digital camera 100 to acquire metadata and images which are held and released by the digital camera 100 from the digital camera 100.

A contents management module 304 has the function of retaining and managing image data and its metadata acquired by the contents server control module 303, as well as distributing the data to the metadata management module 302.

Figure 4:
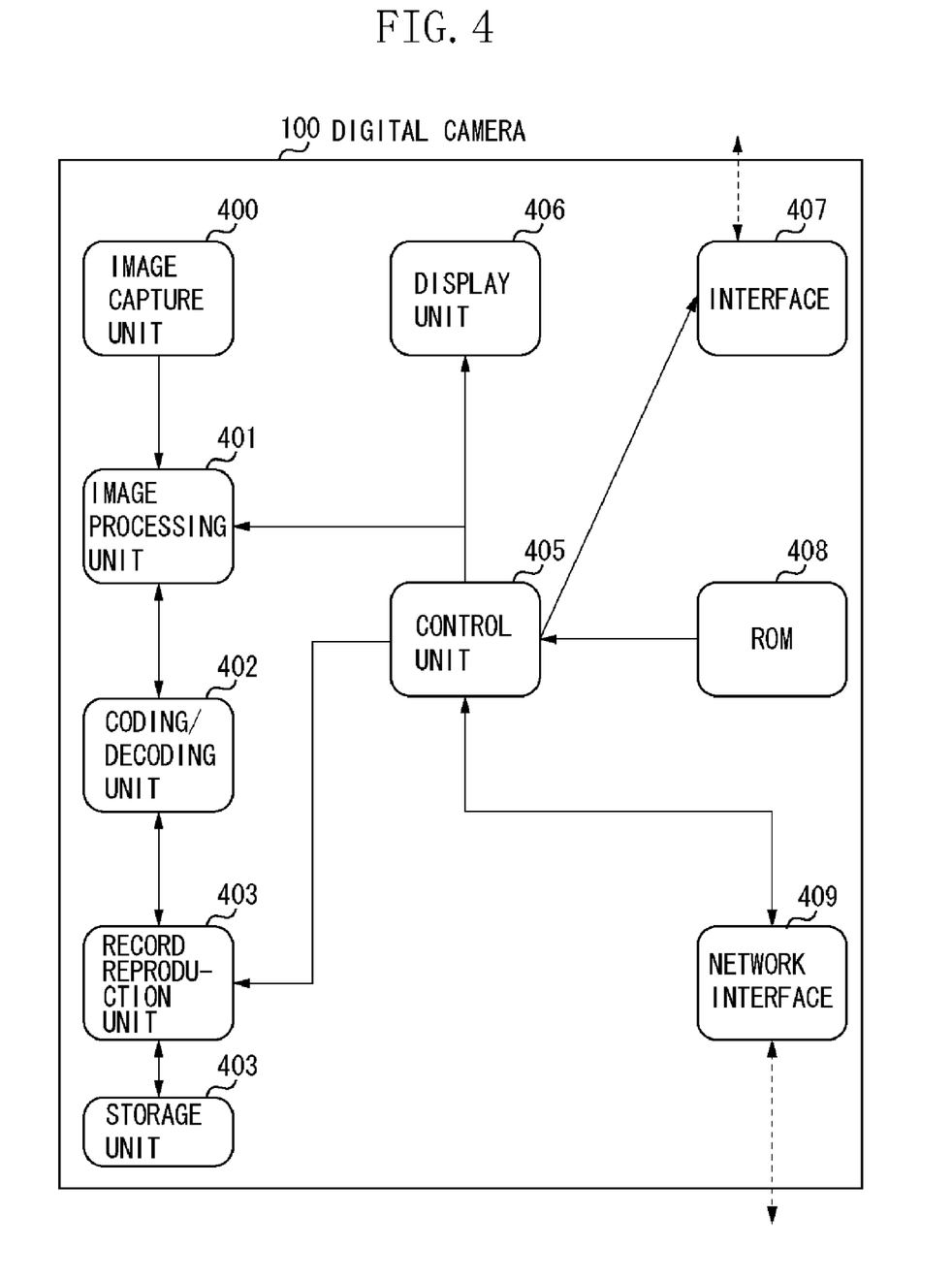
FIG. 4 is a functional block diagram illustrating a hardware configuration of a digital camera.

FIG. 4 is a functional block diagram illustrating a hardware configuration of the digital camera 100.

An imaging unit 400 captures an image of an object.

An image processing unit 401 converts a captured image output from the imaging unit 400 into image data of the predetermined format.

A coding/decoding unit 402 executes the predetermined coding (e.g., discrete cosine transformation (DCT), variable-length coding after quantization) to image data output from the image processing unit 401. Further, the coding/decoding unit 402 expands and decodes compressed image data reproduced from a record reproduction unit 403 to supply the image data to the image processing unit 401.

The record reproduction unit 403 records the compressed and coded image data in a storage unit 410, or reads image data from the storage unit 410 to reproduce it.

A storage unit 404 stores the compressed and coded image data.

A control unit 405 includes a microcomputer and a memory which can store the predetermined program code. The control unit 405 controls and manages operation of each processing unit which configures the digital camera 100. The control unit 405 further has a server function of distributing a recorded image via a network and a function of generating metadata of the recorded image.

A display unit 406 displays an image captured by the imaging unit 400 using an electric view finder (EVF), a liquid crystal panel or the like.

An interface 407 communicates image data captured by the imaging unit 400.

An ROM 408 stores information concerning a function of the digital camera 100.

A network interface (NET/IF) 409 executes control to transfer data between information processing apparatuses via a network, and diagnose connection conditions.

Figure 5:
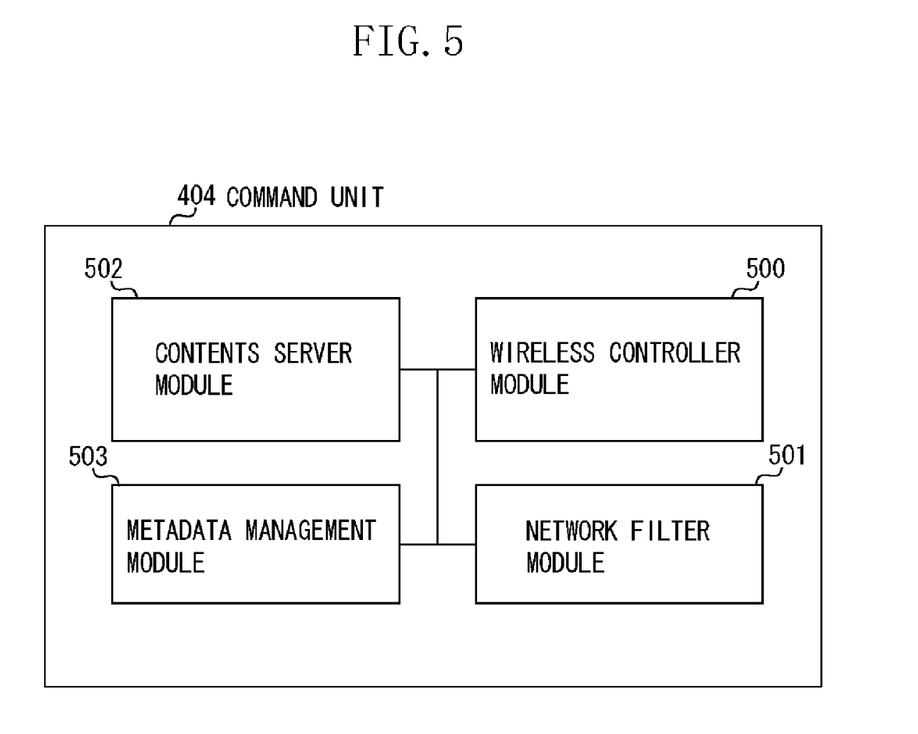
FIG. 5 is a block diagram illustrating a module configuration of a server function and a wireless LAN control function for distributing contents via a network.

FIG. 5 is a block diagram illustrating a software module configuration concerning a network utilizing the UPnP™ of the digital camera 100.

A wireless controller module 500 has a function required for wireless LAN network connection, a function of switching connection in the ad hoc mode and the infra mode, and a function supporting the WOL.

A network filter module 501 has the function of retaining MAC address information about an apparatus connected in the ad hoc mode. Further, the network filter module 501 has the function of setting a network filter that prevents access from an external apparatus other than an apparatus connected in the ad hoc mode, by referring to the MAC address information.

A contents server module 502 has the function of distributing image data stored in the storage unit 410 to an external apparatus (digital television 103, printer 104, etc.) which is connected to a network. Further, the contents server module 502 has the SSDP, the GENA and the SOAP which are a device architecture function of the UPnP™.

A metadata management module 503 has a function of a Media Server V 1.0 of the UPnP™ and executes processing such as generation, control, deletion and update of metadata on an image stored in the storage unit 410. Further, the metadata management module 503 has the function of distributing metadata of an image to an external apparatus which is connected to a network. Furthermore, the metadata management module 503 has the function of executing session management when it is accessed by an external apparatus.

Figure 6:
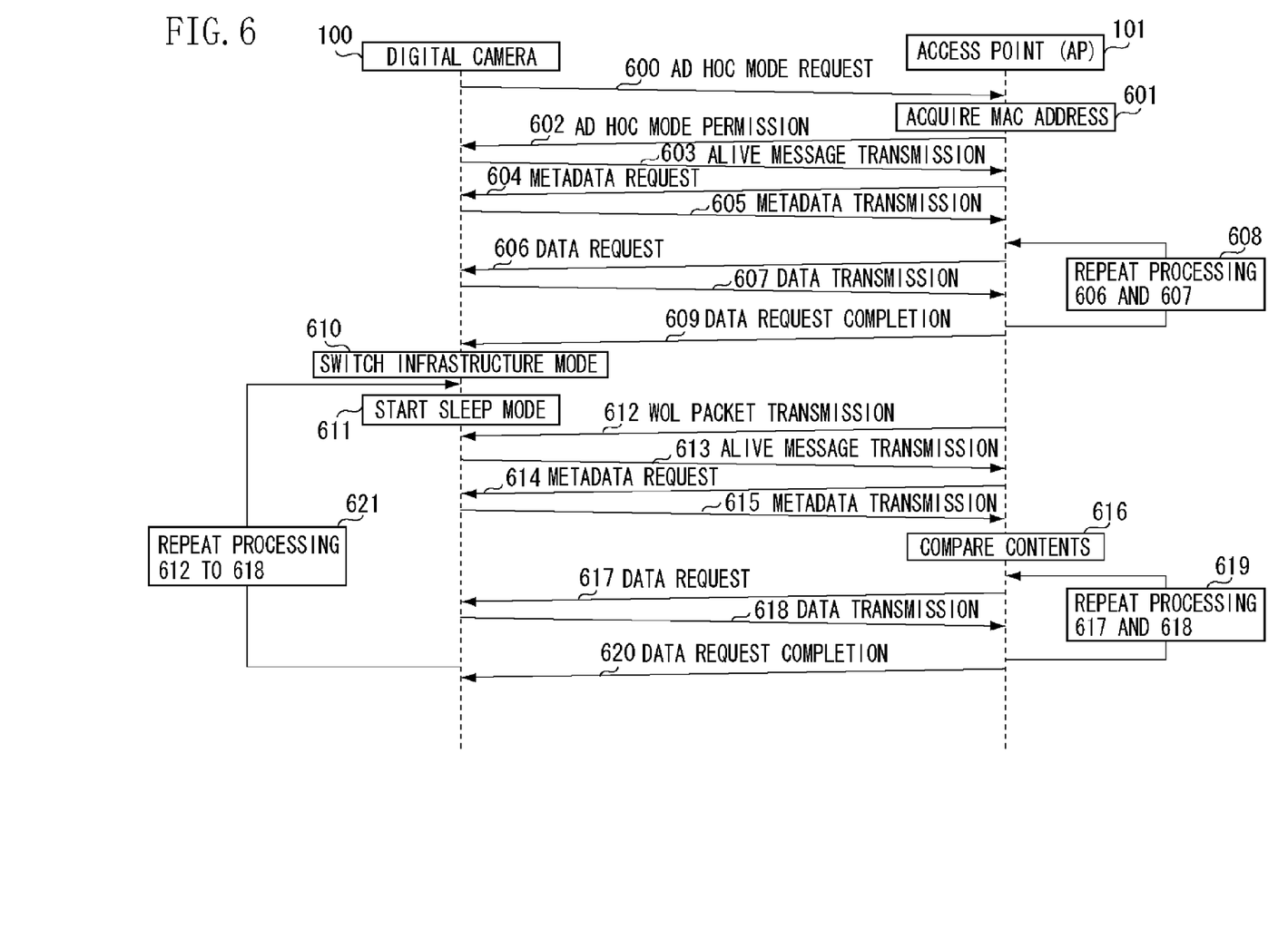
FIG. 6 is a sequence chart illustrating the entire processing of a system.
Figure 7:
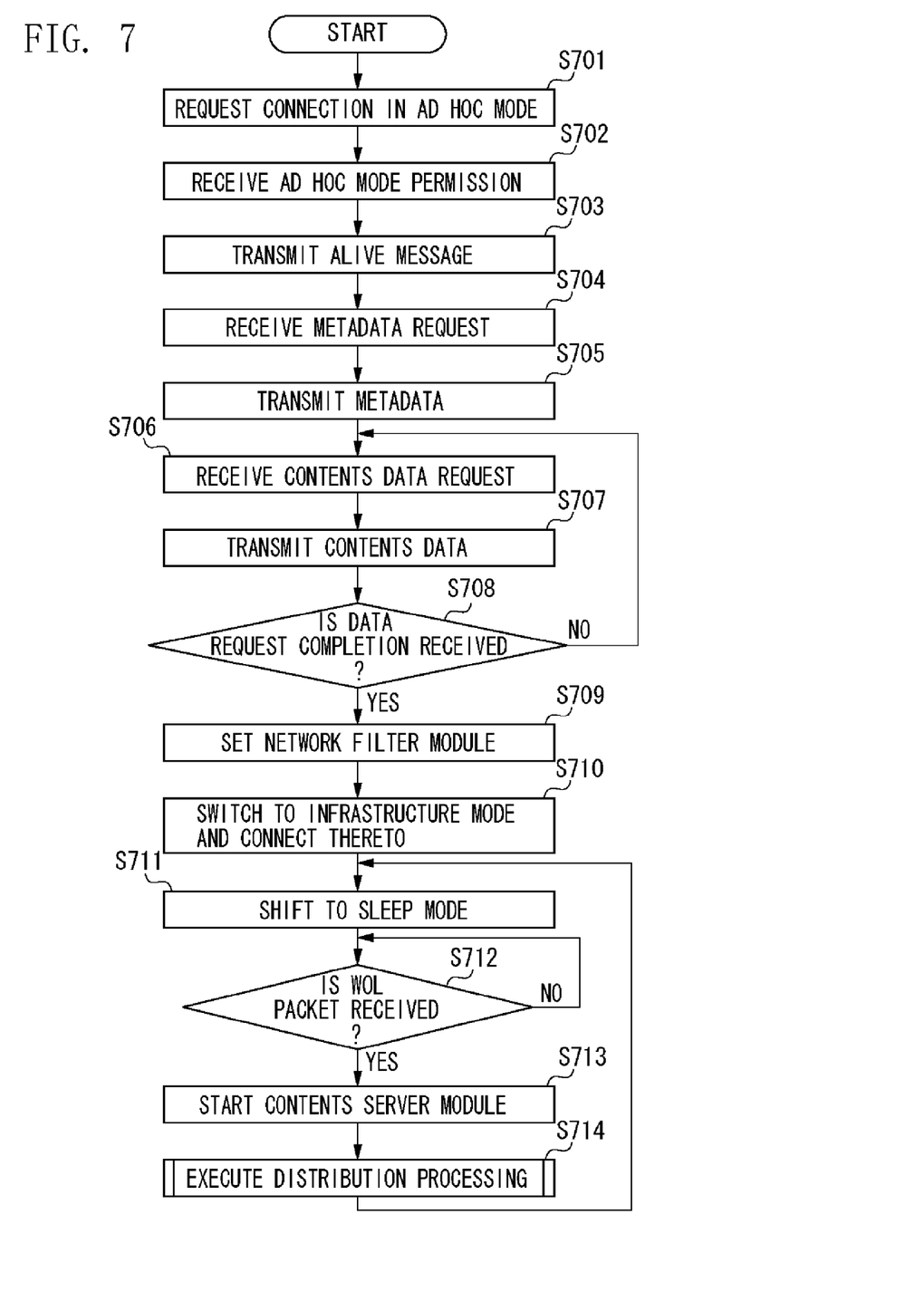
FIG. 7 is a flowchart illustrating the flow of processing which a digital camera executes.
Figure 8:
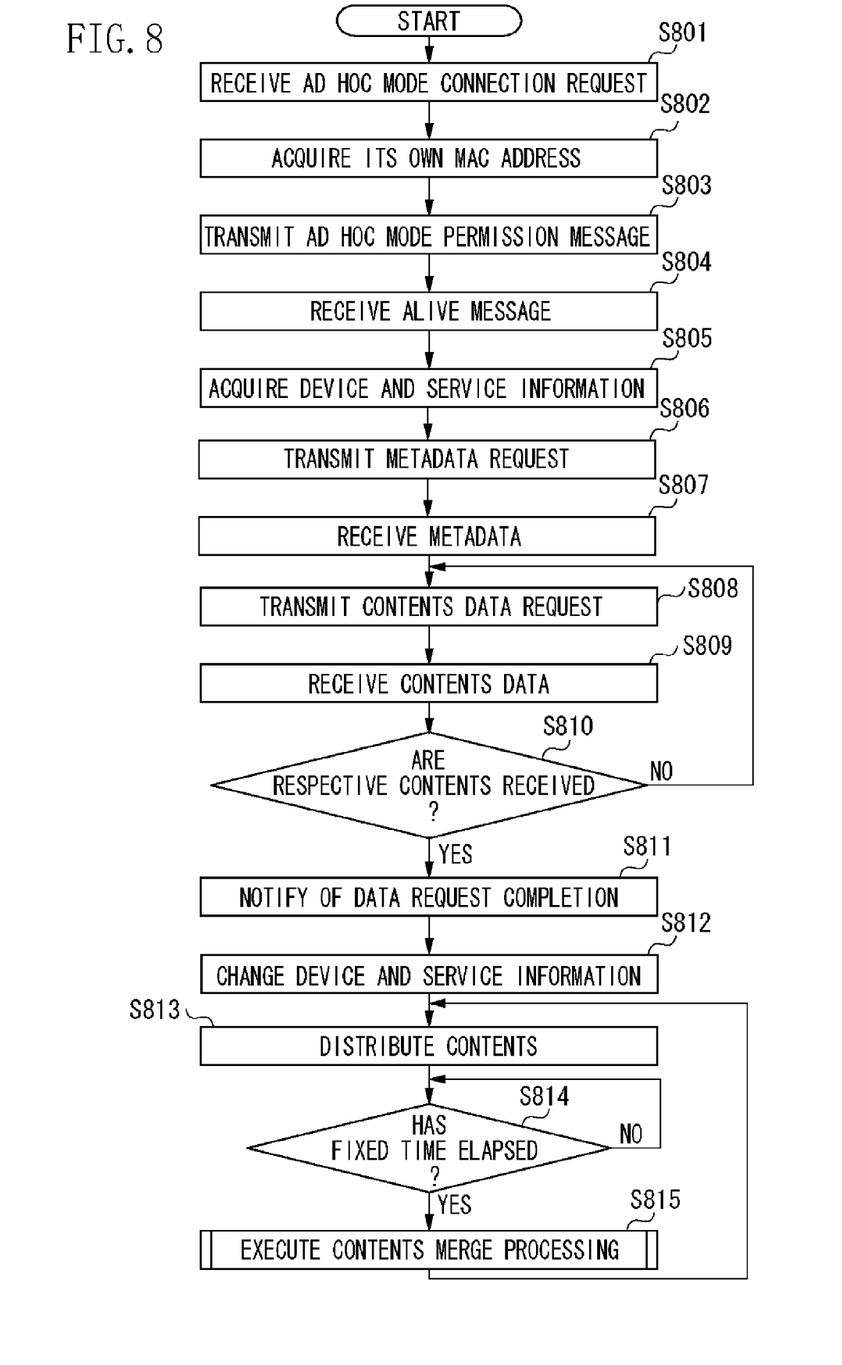
FIG. 8 is a flowchart illustrating the flow of processing which an AP executes.

Next, the flow of the entire processing of a system (sequence chart) in the present exemplary embodiment will be described using FIG. 6. In order to clarify description, a protocol of the UPnP™ will be described as an example but the present invention is not limited to the protocol. FIG. 7 is a flowchart illustrating the flow of processing which is executed by the digital camera 100 as one example of the service distribution apparatus. FIG. 8 is a flowchart illustrating the flow of processing which is executed by the AP 101 as one example of the proxy apparatus.

In the present exemplary embodiment, the AP 101 supports connection modes both in the ad hoc mode and the infra mode. Further, the AP 101 transmits a beacon corresponding to connection modes of both the ad hoc mode and the infra mode. The digital camera 100 recognizes that the AP 101 supports the connection modes of both the ad hoc mode and the infra mode from the beacon.

In step S701, the digital camera 100 recognizes that the AP 101 supports the connection modes of both the ad hoc mode and the infra mode and executes wireless network connection request 600 to the AP 101 in the ad hoc mode. In the present exemplary embodiment, as the wireless network connection request 600 in the ad hoc mode, Probe Request defined by IEEE 802.11 is used.

In step S802, the AP 101 having received wireless network connection request in the ad hoc mode in step S801 acquires its own MAC address if it is connectable to the digital camera 100 (601). Next, in step S803, the AP 101 adds its own MAC address to an ad hoc mode permission message 602 and returns the message. In the present exemplary embodiment, as the ad hoc mode permission message 602, Probe Response defined by IEEE 802.11 is used.

In step S702, the digital camera 100 receives the ad hoc mode permission message 602 and completes connection to the AP 101 in the ad hoc mode.

Thus, the digital camera 100 is connected to the AP 101 in the ad hoc mode. Since the AP 101 does not transfer data received from the digital camera 100, an external apparatus other than the AP 101 (e.g., digital television 103 or printer 104) does not receive data transmitted by the digital camera 100. Accordingly, the digital camera 100 can be hidden from an external apparatus.

Thus, the digital camera 100 is not accessed from an external apparatus. Further, a possibility is reduced that the digital camera 100 receives denial of services attack (DoS attack) from an external apparatus, which makes distribution of network services unable.

In step S703, after the digital camera 100 is connected in the ad hoc mode, the digital camera 100 transmits an ALIVE message 603 which is an advertisement message to notify of its own presence.

The AP 101 receiving the ALIVE message 603 of the SSDP in step S804 acquires a device information URL of the digital camera 100 which is recorded on the ALIVE message 603. Further, in step S805, the AP 101 acquires device and service information from the digital camera 100 based on the acquired device information URL.

Next, in step S806, the AP 101 extracts a metadata acquisition URL of contents held by the digital camera 100 based on the service information acquired in step S805 and transmits metadata request 604 from its URL to the digital camera 100.

In step S705, the digital camera 100 having received the metadata request 604 in step S704 transmits metadata 605 of the contents held by itself to the AP 101.

The AP 101 having received the metadata 605 of the contents in step S807 extracts a URL for acquiring the contents from the metadata 605. Further, in step S808, the AP 101 transmits data request 606 which asks for transmission of contents data to the digital camera 100, using the URL.

In step S707, the digital camera 100 having received the data request 606 in step S706 transmits contents data 607 which is held by itself.

In step S810, the AP 101 having received the contents data 607 from the digital camera 100 in step S809 refers to the meta data 605 to determine whether all contents data which needs to be received has been received from the digital camera 100. As a result, if it is determined that all contents data which needs to be received has not been received from the digital camera 100, the processing proceeds to step S808. The processing 606 and the processing 607 are repeated by the number of contents data which needs to be received (608).

All contents data which needs to be received may be all data held by the digital camera 100 or all data that a user has permitted the external equipment to access (acquire, read, etc.). A user operates the digital camera 100 to give the permission for each of contents. Only contents to which the permission is given, are recorded on the metadata 605. Thus, only contents to which access from external equipment is permitted are received by the AP 101 and only the permitted contents can be distributed.

On the other hand, as a result of determination in step S810, if all contents data which needs to be received has been received from the digital camera 100, the processing proceeds to step S811. The AP 101 notifies the digital camera 100 that handling of data request has been completed (609).

When the AP101 notifies the digital camera 100 that the handling of data request is completed in step S708, in step S709, the network filter module 501 sets a network filter. The network filter is configured to receive no signal utilizing the UPnP™ from an apparatus other than the MAC address of the AP 101.

The step S709 may be executed after step S702 in which connection to the AP 101 is completed. In this way, the contents are not directly accessed from an external apparatus, during which a network filter is set. Thus, it is possible to prevent direct access from an external apparatus even after switch to the infra mode, as described later.

Thereafter, in step S710, the digital camera 100 is switched from the ad hoc mode to the infra mode and is connected to the AP 101. The digital camera 100 is switched to the infra mode. Thus, the digital camera 100 can use an external apparatus which is connected to a network using a function (e.g., file transfer protocol (FTP), hypertext transfer protocol (HTTP), etc.) other than a function utilizing the UPnP™. When the digital camera 100 in the present exemplary embodiment uses a function other than a function utilizing the UPnP™, since it is not operated as a server, it is not accessed from an external apparatus.

Further, after switching to the infra mode, the AP 101 carries out as a substitute the processing such as acquisition and reading of contents utilizing the UPnP™ from an external apparatus. Further, the digital camera 100 can be switched to the infra mode. Thus, power saving defined by the infra mode as a sleep mode can be used. Since the power saving defined by the infra mode is determined in detail, elaborate control is possible.

Then, in step S711, the digital camera 100 is shifted to the sleep mode (power saving mode). In step S712, the sleep mode waits for a WOL packet. Thus, electric power saving can be executed.

When communication is not executed with an external apparatus to be connected to a network during a fixed time, the digital camera 100 may be switched to the sleep mode. Thus, when the digital camera 100 uses a function other than a function utilizing the UPnP™ directly after switching to the infra mode, the digital camera 100 can swiftly deal with the change.

The digital camera 100 can perform a function such as photographing during the sleep mode. Thus, for example during the sleep mode, the digital camera 100 can capture a photograph, so that contents can be newly added. Therefore, the digital camera 100 can devote a computer resource to processing other than contents distribution such as photographing. Thus, the convenience of a user is improved. Further, for the purpose of actively operating in association with an external apparatus using a function of the FTP and the HTTP of the digital camera 100, a user can switch the digital camera 100 from the sleep mode to a normal mode.

On the other hand, after the AP 101 notifies the digital camera 100 of completion of data request in step S811, in step S812, the metadata management module 302 generates metadata of contents based on the contents acquired from the digital camera 100. More specifically, the metadata management module 302 edits device and service information of the digital camera 100 to execute operation for rewriting a URL or the like into its own internet protocol (IP) address.

Then, based on the device and service information edited in step S812, in step S813, the contents server control module 303 is started to distribute contents instead of the digital camera 100. Thus, distribution of contents or the like is not executed by the service distribution apparatus which may have a poor computer resource but is executed by the proxy apparatus which has a rich computer resource.

Thus, even when a number of contents is large and high-value-added processing such as sorting or retrieval type request and needs to be executed, the digital camera 100 can process in real time. Thus, the convenience of a user is improved. Further, even when a user frequently executes ON/OFF switch of an electric power source and switch of an operation mode of the digital camera 100, contents can be distributed to an external apparatus (digital television 103 or printer 104) which is connected to a network.

Further, in step S814, the AP 101 monitors whether a fixed time has elapsed after distribution of contents is started. When a fixed time has elapsed, in step S815, merge processing of contents is executed. The merge processing of contents is performed to carry out synchronization of contents data of the AP 101 with the proxy apparatus, for example, when the digital camera 100 captures a new photograph and contents data of the digital camera 10 is changed.

The AP 101 monitors the elapse of a fixed time. However, the merge processing of contents in step S815 may be executed by instructions from a user to the digital camera 100 or the AP 101. Thus, contents data on the digital camera 100 and the AP 101 can be synchronized in timing as the user desires.

Figure 9:
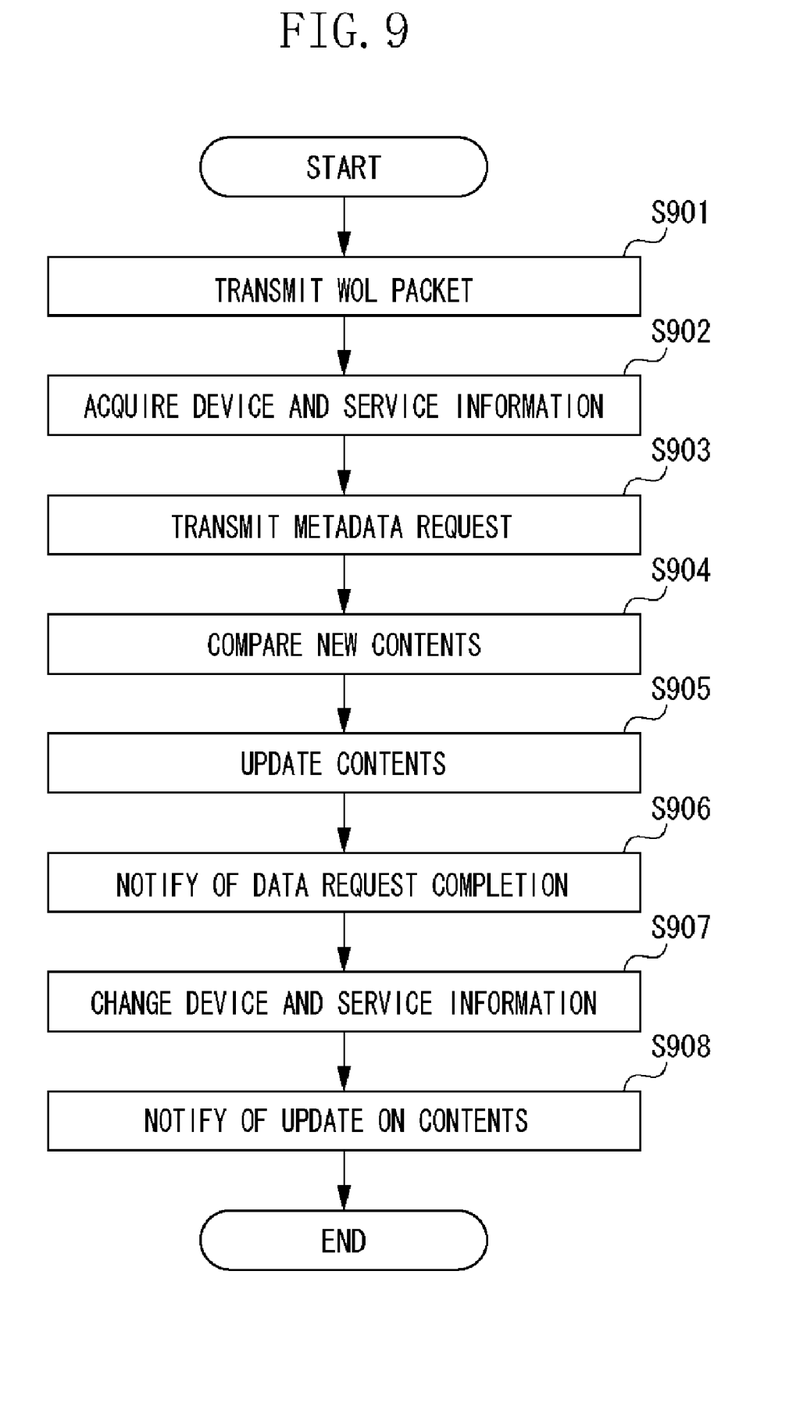
FIG. 9 is a flowchart illustrating the detailed flow of merge processing of contents which is executed by an AP.

FIG. 9 is a flowchart illustrating the detailed flow of contents merge processing in step S815 which is executed by the AP 101 as one example of the proxy apparatus. The contents merge processing will be described below using FIGS. 6, 7 and 9.

In step S901, the AP 101 transmits WOL packet to the digital camera 100 (612). The WOL packet includes several methods. In this case, a commonly used Magic Packet™ method of Advanced Micro Devices (AMD) Inc. will be employed. Magic Packet™ is a user datagram protocol (UDP) data program having data of 102 bytes and a UDP port of a destination address is optional. The data of 102 bytes refers to data in which 0xffffffffffff (6 bytes) and an MAC address (6 bytes) of a network adaptor of a computer for the WOL are repeated 16 times after an IP header.

When the digital camera 100 receives the WOL packet in step S712, in step S713, the digital camera 100 starts the contents server module 502.

Then, in step S714, the digital camera 100 executes contents distribution processing. The distribution processing is similar to the processing in step S703 or 708 shown in FIG. 7. Thus, newly added contents of the digital camera 100 can be distributed to the AP 101.

In step S703, the digital camera 100 transmits an ALIVE message 613 of the SSDP.

In step S902, the AP 101 receives the ALIVE message 613, acquires a device information URL of the digital camera 100 which is recorded on the ALIVE message 613, and acquires device and service information from the digital camera 100.

In next step S903, the AP 101 extracts a metadata acquisition URL of contents which is held by the digital camera 100 from the service information acquired in step S902 and transmits the metadata request 614 from its URL or the like to the digital camera 100.

In step S705, the digital camera 100 having received the metadata request 614 in step S704 transmits metadata 615 of contents which is held by itself, to the AP 101.

In step S904, the AP 101 having received metadata 615 of contents extracts contents which needs to be newly added and deleted from the metadata 615 based on the result of comparison with existing contents (616).

In step S905, the AP 101 updates contents based on the result of extraction in step S904. The AP 101 transmits data request 617 of contents which needs to be newly added, to the digital camera 100 and receives the contents from the digital camera 100 (618). Further, based on the result of extraction in step S904, the AP 101 deletes contents which are not contained in metadata. The processing is repeated until contents data of the digital camera 100 and contents data of the AP101 are synchronized (619).

This reduces a processing load when the digital camera 100 synchronizes contents data with the AP 101, compared with the case in which the AP 101 reacquires all contents. Accordingly, electric power is saved.

Then, the processing proceeds to step S906 and the AP 101 notifies the digital camera 100 of data request completion 620.

In step S907, the AP 101 generates metadata of contents based on the updated contents. Further, the AP 101 edits device and service information about the digital camera 100 and rewrites a URL or the like into its own IP address. Then, in step S908, the AP 101 notifies an external apparatus (digital television 103 or printer 104) which is connected to a network, of an update of its own contents using an event of the GENA. By the notification, a user of the digital television 103 or the like can know the update of contents. Thus, the convenience of a user is improved.

When the distribution processing of the added contents is completed, in the digital camera 100, the processing proceeds to step S711 and the digital camera 100 is switched again to the sleep mode (621).

In the above-described exemplary embodiment, a case will be described in which the proxy apparatus uses the ad hoc mode as a connection mode which does not transfer data.

However, a connection method is not limited to this. The distribution apparatus may be connected to the proxy apparatus using a specific SSID in which the proxy apparatus does not transfer data. SSID is an abbreviation of service set identifier. Further, a message requesting that the proxy apparatus does not transfer data in Probe Request may be contained therein. Also in such a case, since the proxy apparatus does not transfer data, an effect similar to that of the above-described exemplary embodiment can be obtained.

Figure 10:
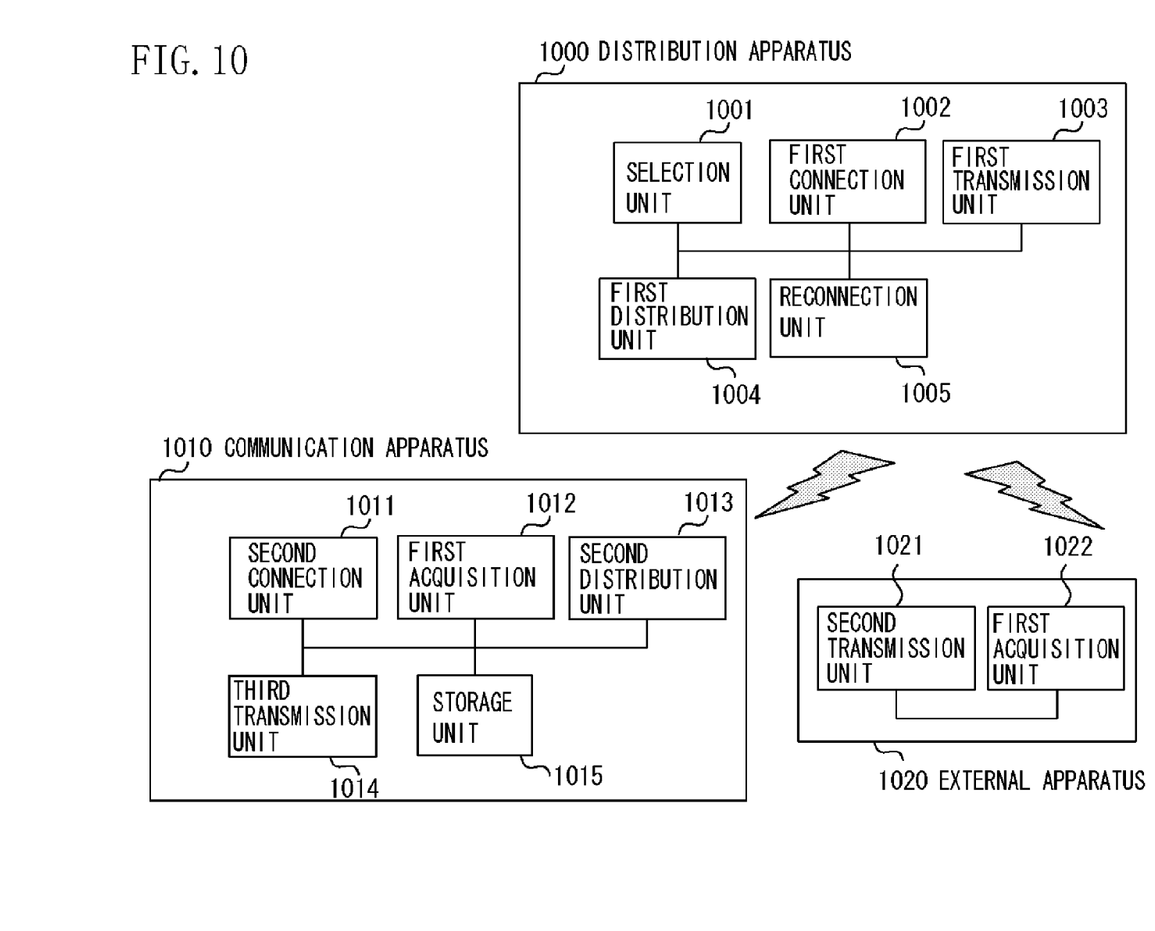
FIG. 10 is a block diagram illustrating a network system.

A network system including the above-described service distribution apparatus and proxy apparatus can be illustrated as a functional block diagram shown in FIG. 10.

The system includes a distribution apparatus 1000, a communication apparatus 1010, and an external apparatus 1020.

A selection unit 1001 selects a communication mode when in one of a first communication mode and a second communication mode, connection to the communication apparatus 1010 is made. The first communication mode refers to a mode for transferring a notification message which indicates that the distribution apparatus 1000 having the function of distributing contents exists on a network, to the external apparatus 1020. The second communication mode refers to a mode for preventing the communication apparatus 1010 from transferring the notification message to the external apparatus 1020.

A first connection unit 1002 selects the second communication mode using the selection unit 1001 to connect to the communication apparatus 1010 in order to restrict the transfer of the notification message containing information about the distribution apparatus 1000 to an external apparatus.

A first transmission unit 1003 transmits the notification message to the communication apparatus 1010 in response to the connection with the first connection unit 1002.

A first distribution unit 1004 distributes contents to the communication apparatus 1010 corresponding to the request for the contents based on the notification message from the communication apparatus 1010. Therefore, the communication apparatus 1010 can distribute the contents to the external apparatus 1020 instead of the distribution apparatus 1000.

A reconnection unit 1005 reconnects to the communication apparatus 1010 in the first mode after the contents required by the first distribution unit 1004 is distributed to the communication apparatus 1010.

A second connection unit 1011 connects to the distribution unit 1000 via a network in one of the first communication made and the second communication mode.

A first acquisition unit 1012 acquires the contents from the distribution unit 1000 based on a notification message transmitted from the distribution unit 1000 when the communication apparatus 1010 is connected to the distribution unit 1000 via a network in the second communication mode.

A second distribution unit 1013 distributes the contents acquired by the first acquisition unit 1012 instead of the distribution apparatus 1000 in response to a request from the external apparatus 1020.

A transmission unit 1014 transmits a notification message informing that the above-described location information to the external apparatus 1020 has been changed.

A storage unit 1015 stores the contents acquired by the first acquisition unit 1012.

A second transmission unit 1021 transmits a contents request to the distribution apparatus 1000 based on the changed notification message from the communication apparatus 1010.

A second acquisition unit 1022 acquires the contents which are distributed by an apparatus having received the above-described contents request.

As described above, in the configuration according to the present exemplary embodiment, the AP 101 functions as a proxy apparatus and the digital camera 100 functions as a service distribution apparatus. The proxy apparatus carries out as a substitute the processing of service such as contents distribution which is executed by the service distribution apparatus. Thus, even when a number of contents is large and high-value-added processing such as sorting or retrieval type request needs to be executed, the processing can be executed in real time. Further, this improves the convenience of a user.

Furthermore, the service distribution apparatus can devote a computer resource to the processing other than contents distribution such as photographing processing, thereby improving the convenience of a user. This produces a significant effect when the service distribution apparatus has a poor computer resource. Still furthermore, since use of the computer resource of the service distribution apparatus is reduced and consumption of electric power is saved, a significant effect is produced particularly in the service distribution apparatus which is operated by a battery.

Further, even when a user frequently switches on and off a power source or an operation mode of the service distribution apparatus, the contents can be distributed to another apparatus which is connected to a network.

Furthermore, the service distribution apparatus executes a wireless network connection request in the ad hoc mode. Thus, the service distribution apparatus can be hidden from a network apparatus other than the proxy apparatus. This can prevent access to the service distribution apparatus from the network apparatus other than the proxy apparatus before the proxy apparatus executes substitute processing. Furthermore, a user of the network apparatus other than the proxy apparatus cannot grasp the service distribution apparatus. Thus, the user can certainly use substitute processing of the proxy apparatus without accessing the service distribution apparatus. Still further, the user of the network apparatus other than the proxy apparatus cannot grasp the service distribution apparatus. Therefore, a possibility of DoS attack or the like is reduced.

Filtering may be executed when the proxy apparatus is connected to the service distribution apparatus. Thus, the service distribution apparatus may be hidden from the network apparatus other than the proxy apparatus.

Further, after the service distribution apparatus is once connected to the proxy apparatus, the service distribution apparatus is reconnected to the proxy apparatus by switching from the ad hoc mode to the infra mode. Thus, the service distribution apparatus can actively cooperate with another apparatus which is connected to a network using a function such as the FIP and the HTTP other than the substitute function.

Furthermore, when a fixed time has elapsed after the proxy apparatus notifies of data request completion, merge processing of contents is executed.

Therefore, contents data of the service distribution apparatus can be periodically synchronized with the proxy apparatus.

Still furthermore, the contents merge processing is executed by instructions from a user to the service distribution apparatus or the proxy apparatus. Thus, contents data of the digital camera 100 and the AP 101 can be synchronized in timing as the user desires.

Further, the proxy apparatus extracts contents which need to be newly added and deleted from metadata, by comparison between the existing contents and metadata so as to update contents based on the extracted result. Thus, the service distribution apparatus executes only bare-bones processing. Thus, the contents data can be synchronized with the proxy apparatus.

Furthermore, when the contents have been updated, the proxy apparatus notifies an external apparatus thereof. Thus, the convenience of a user who uses the external apparatus is improved.

The present invention may supply a recording medium recording a program code of software which realizes the above-described function to cause a system or a computer of an apparatus (central processing unit (CPU) or micro processing unit (MPU)) to read the program code stored in the recording medium to execute it. In this case, the program code itself read from a storage medium realizes a function in the present exemplary embodiment. Thus, the storage medium storing the program code will constitute the present invention.

As the storage medium for supplying the program code, for example a flexible disk, a hard disk, an optical disk, a magneto optical disk, a compact disc read only memory (CD-ROM), a compact disc-recordable (CD-R), a magnetic tape, a nonvolatile memory card, a read only memory (ROM), a digital video disc (DVD) or the like can be used.

Further, by executing a program code read by a computer, not only the above described function is realized but also a part or the whole of actual processing can be executed by an OS which runs on a computer based on the command of its program code. Thus, the above-described function may be realized. OS is an abbreviation of operating system.

Furthermore, the program code read from the storage medium is written into a memory which is provided in a function expansion board inserted in a computer or a function expansion unit connected to a computer. Then, a CPU which is provided in the function expansion board or the function expansion unit executes a part or the whole of actual processing based on the command of its program code. Thus, the above-described function may be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-321644 filed Dec. 17, 2008, which is hereby incorporated by reference herein in its entirety.

What is claimed is:

1. A communication apparatus connected to an external apparatus via a network, the communication apparatus comprising:
   a receiving unit configured to receive location information which indicates a location of content from a distribution apparatus;
   a connection unit configured to support both a first communication mode for transferring the location information to the external apparatus and a second communication mode for restricting transfer of the location information to the external apparatus, and to connect to the distribution apparatus in one of the first communication mode and the second communication mode;
   an acquisition unit configured to acquire the location information from the distribution apparatus in a case that the communication apparatus connects to the distribution apparatus by the connection unit in the second communication mode; and
   a distribution unit configured to distribute the content acquired from the communication apparatus based on the location information in a case of receiving a request from the external apparatus.

2. The communication apparatus according to claim 1, further comprising:
   a transmission unit configured to transmit the location information in a case that the location of the content is changed, to the external apparatus.

3. The communication apparatus according to claim 1, wherein the communication apparatus is reconnected to the distribution apparatus in the first communication mode after the acquisition unit acquires the content.

4. The communication apparatus according to claim 3, wherein the communication apparatus shifts to a power saving mode in a case of reconnection to the distribution apparatus in the first communication mode.

5. The communication apparatus according to claim 1, wherein the acquisition unit acquires added content in a case that the content is added to the distribution apparatus.

6. The communication apparatus according to claim 1, wherein, in the second communication mode, the distribution apparatus and the communication apparatus directly communicate with each other on a one-to-one basis.

7. The communication apparatus according to claim 1, wherein the second communication mode is an ad hoc mode defined by IEEE 802.11.

8. The communication apparatus according to claim 1, wherein the first communication mode is an infrastructure mode defined by IEEE 802.11.

9. A distribution apparatus for distributing content and connecting to a communication apparatus, the distribution apparatus comprising:
   a selection unit configured to select one of a first communication mode, in which the communication apparatus that receives location information which indicates a location of the content from the distribution apparatus transfers the location information to an external apparatus, and a second communication mode, in which the communication apparatus restricts transfer of the location information to the external apparatus;
   a connection unit configured to select the second communication mode using the selection unit to connect to the communication apparatus;
   a transmission unit configured to transmit the location information to the communication apparatus in a case that the connection unit connects to the communication apparatus in the second communication mode; and
   a distribution unit configured to distribute the content to the communication apparatus in a case of receiving a request for the content from the communication apparatus.

10. The distribution apparatus according to claim 9, further comprising:
   a reconnection unit configured to reconnect to the communication apparatus in the first communication mode after the content is distributed to the communication apparatus by the distribution unit.

11. A control method for a communication apparatus connected to an external apparatus via a network, the control method comprising:
- receiving location information which indicates a location of the content from a distribution apparatus;
- supporting both a first communication mode for transferring the location information to the external apparatus and a second communication mode for restricting transfer of the location information to the external apparatus;
- connecting to the distribution apparatus in one of the first communication mode and the second communication mode;
- acquiring the location information from the distribution apparatus in a case that the communication apparatus connects to the distribution apparatus in the second communication mode; and
- distributing the content from the communication apparatus based on the location information in a case of receiving a request from the external apparatus.

12. A recording medium storing a program comprising program code that, when executed by a computer, implements a control method comprising:
- receiving location information which indicates a location of content from a distribution apparatus;
- supporting both a first communication mode for transferring the location information to an external apparatus and a second communication mode for restricting transfer of the location information to the external apparatus;
- connecting to the distribution apparatus in one of the first communication mode and the second communication mode;
- acquiring the location information from the distribution apparatus in a case that a communication apparatus connects to the distribution apparatus in the second communication mode; and
- distributing the content from the communication apparatus based on the location information in a case of receiving a request from the external apparatus.

13. A control method of a distribution apparatus for distributing content and connecting to a communication apparatus, the control method comprising:
- selecting one of a first communication mode, in which the communication apparatus that receives location information which indicates a location of the content from the distribution apparatus transfers the location information to an external apparatus, and a second communication mode, in which the communication apparatus restricts transfer of the location information to the external apparatus;
- selecting the second communication mode to connect to the communication apparatus;
- transmitting the location information to the communication apparatus in a case that the distribution apparatus connects to the communication apparatus in the second communication mode; and
- distributing the content to the communication apparatus in a case of receiving a request for the content from the communication apparatus.

14. A recording medium storing a program comprising program code that, when executed by a computer, implements a control method comprising:
- selecting one of a first communication mode, in which a communication apparatus that receives location information which indicates a location of content from a distribution apparatus transfers the location information to an external apparatus, and a second communication mode, in which the communication apparatus restricts transfer of the location information to the external apparatus;
- selecting the second communication mode to connect to the communication apparatus;
- transmitting the location information to the communication apparatus in a case that the distribution apparatus connects to the communication apparatus in the second communication mode; and
- distributing the content to the communication apparatus in a case of receiving a request for the content from the communication apparatus.

15. A system including a distribution apparatus for distributing content and a communication apparatus connected to an external apparatus via a network, the distribution apparatus comprising:
- a selection unit configured to select one of a first communication mode, in which the communication apparatus that receives location information which indicates a location of the content from the distribution apparatus transfers the location information to the external apparatus, and a second communication mode, in which the communication apparatus restricts transfer of the location information to the external apparatus;
- a first connection unit configured to select the second communication mode using the selection unit to connect to the communication apparatus;
- a first transmission unit configured to transmit the location information to the communication apparatus in a case that the first connection unit connects to the communication apparatus in the second communication mode; and
- a first distribution unit configured to distribute the content to the communication apparatus in a case of receiving a request for the content from the communication apparatus, the communication apparatus comprising:
- a receiving unit configured to receive the location information;
- a second connection unit configured to support both a third communication mode for transferring the location information to the external apparatus and a fourth communication mode for restricting transfer of the location information to the external apparatus, and to connect to the distribution apparatus in one of the third communication mode and the fourth communication mode;
- a first acquisition unit configured to acquire the location information from the distribution apparatus in a case that the communication apparatus connects to the distribution apparatus by the second connection unit in the fourth communication mode; and
- a second distribution unit configured to distribute the content acquired from the communication apparatus based on the location information in a case of receiving a request from the external apparatus, and the external apparatus comprising:
- a second transmission unit configured to transmit the request for the content to the distribution apparatus based on changed location information received from the communication apparatus; and
- a second acquisition unit configured to acquire the content distributed by the distribution apparatus.

* * * * *